July 13, 1954     J. W. CHANNELL     2,683,304
METHOD OF INSTALLING TELEPHONE DISTRIBUTING TERMINALS
Filed Sept. 6, 1950     2 Sheets-Sheet 1
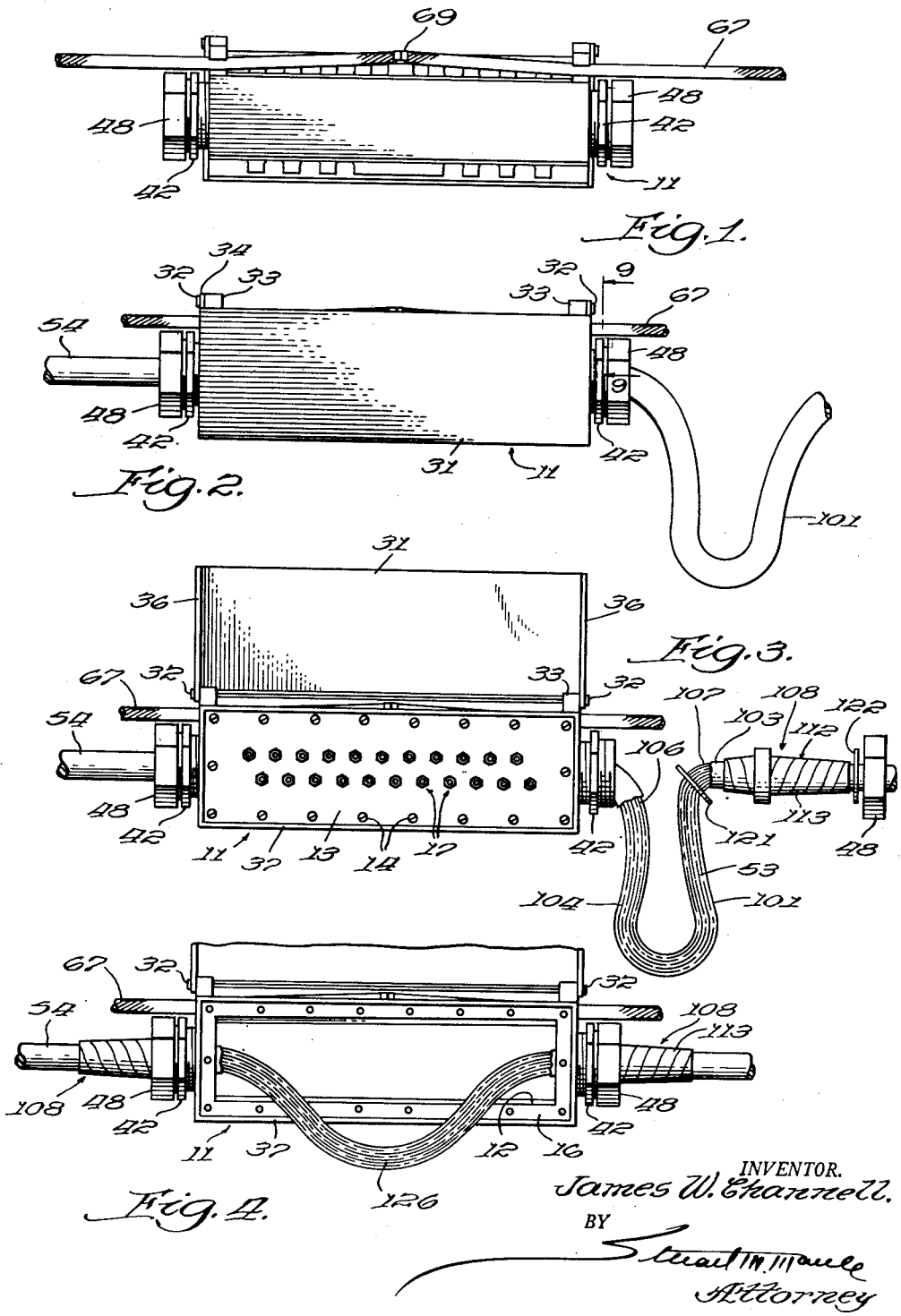

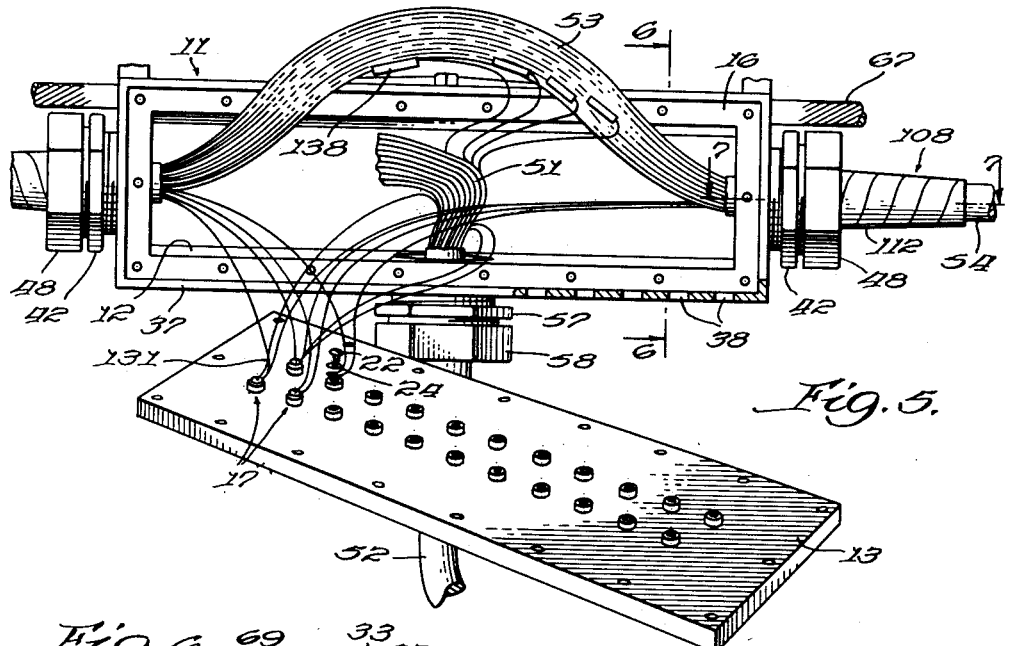
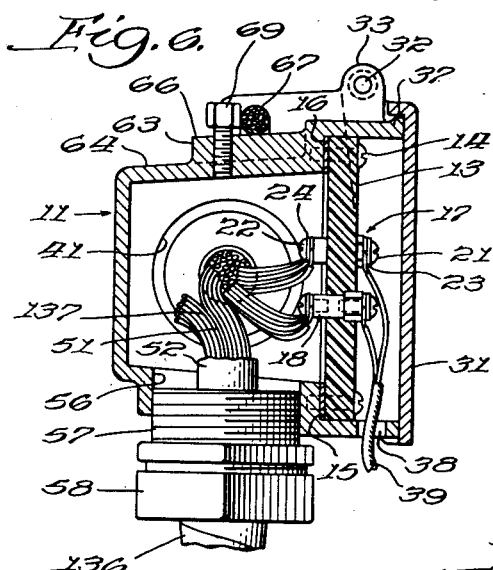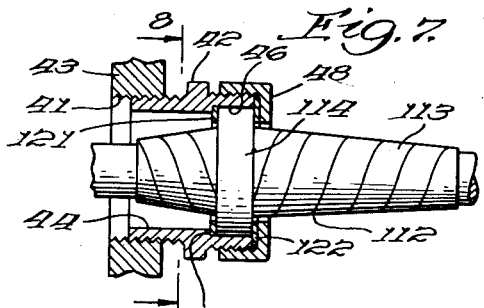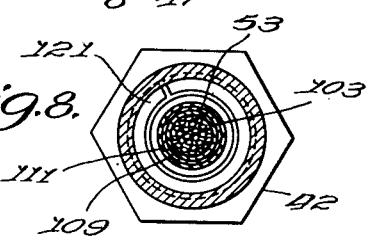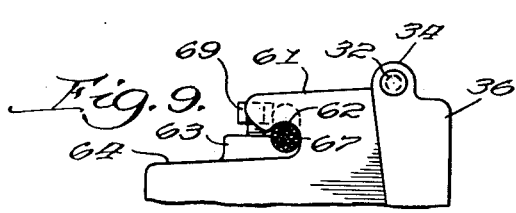

Patented July 13, 1954

2,683,304

UNITED STATES PATENT OFFICE 2,683,304

METHOD OF INSTALLING TELEPHONE DISTRIBUTING TERMINALS

James W. Channell, San Marino, Calif.

Application September 6, 1950, Serial No. 183,389

4 Claims. (Cl. 29—155.55)

This invention relates to electrical cables, and more particularly to methods of providing distributing terminals for sheathed, multi-conductor cables of the type commonly employed in the telephone industry, and as exemplified in United States Letters Patent Numbers 2,318,755 and 2,434,102, issued to me, respectively, on May 11, 1943, and January 6, 1948.

An object of my present invention is to provide a method of installing a distributing terminal of the general type illustrated in my said patents, which constitutes an improvement over the methods now in common use as well as over the methods described in those patents for the following reasons, among others:

First, it makes it possible to install a highly satisfactory distributing terminal in operative association with a multi-conductor sheathed cable without making any splices, and without the customary wiped lead sleeve to enclose and hermetically seal such splices which heretofore have required the services of highly trained specialists commanding a rate of pay far higher than the customary pay of workmen fully qualified to install distributing terminals in accordance with the method of the present invention.

Second, it contemplates connecting each of the several conductors of the cable for which terminals are to be provided, directly to a terminal post individual thereto, by securing thereto a bight portion of the conductor rather than an end of a stub, or branch wire, thus further simplifying the operation of installing the distributing terminal by eliminating any need for a separate stub wire for each cable conductor being connected to a terminal post.

Third, it simplifies the operation of establishing a fluid-tight seal between the sheathed cable and the shell of the distributing terminal at each of the points where the cable passes through a wall of the shell.

Fourth, my present method makes it relatively simple and easy to connect the conductors of a branch cable to selected ones of the conductors of a main cable, without splicing and without the wiped lead sleeves heretofore required for such a connection and regardless of whether the branch and main cables are so connected in the same shell as that which is also used as a distributing terminal, or in one which is individual to the branch and main cable connection.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a longitudinal, medial sectional view of a distributing terminal shell mounted upon a supporting strand as the first step of the method of the present invention.

Figure 2 is a front elevation of the shell of Fig. 1, showing the cable, certain conductors of which are to be provided with terminals, rove therethrough.

Figures 3, 4, and 5 are views similar to Fig. 2, but showing the hinged cover plate raised, and illustrating subsequent steps in the method of the present invention, Figure 5 being drawn to an enlarged scale.

Figure 6 is a transverse vertical sectional view, the plane of section being indicated by the line 6—6 of Fig. 5, and the direction of view by the arrows, but illustrating the apparatus with the parts thereof in the respective positions thereof upon completion of the method of the present invention.

Figure 7 is a detail view in horizontal, medial section through the stuffing box and packing at one end of the apparatus, the plane of section being indicated by the line 7—7 of Fig. 5, and the direction of view by the arrows.

Figure 8 is a transverse, vertical sectional view taken upon the line 8—8 of Fig. 7, with the direction of view as indicated.

Figure 9 is a fragmentary, detail view, viewing the apparatus from one end thereof to illustrate the manner of its being suspended upon a supporting strand.

To convey an understanding of the method of installing a distributing terminal contemplated by the present invention, a brief description of the apparatus required will first be given. This apparatus resembles in a good many respects the distributing terminals respectively forming the subject matter of my two earlier patents hereinabove identified. It comprises a one-piece box-like structure or shell indicated in its entirety at 11 having an opening 12 in its front wall adapted to be closed and hermetically sealed by a panel 13 of suitable rigid insulating material such as "Bakelite," sheet plastic, or the like. This connection plate or panel 13 is adapted to be secured rigidly and tightly in position closing the front of the shell 11 as by a suitable number of screws 14 threadedly engaged within the shell to compress a gasket 15 between the panel 13 and a flat shoulder 16 surrounding the opening 12.

The panel 13 is provided with a suitable number of terminal posts 17 each comprising a relatively short rod 18 of conductive material extending through the panel 13 and far enough beyond each face thereof to make its end easily accessible so as to facilitate connection of wires thereto as will hereinafter be described. Binding screws 21 and 22 are threadedly engaged with the outer and inner ends respectively of each terminal post 17 and preferably washers 23 and 24 are associated with the screws 21 and 22 respectively. Inasmuch as it is customary in commercial telephone work to extend service wires from the distributing terminals in electrically associated pairs, the panel 13 is preferably provided with an even number of terminal posts 17 suitably spaced apart in their mounting upon the insulative material of the panel 13 to insure their being suitably electrically insulated from each other; and inasmuch as one form of standard distributing terminal provides for eleven pairs of service wires, the terminal here chosen for illustration and description carries twenty-two of the terminal posts 17. However, sixteen pair and twenty-six pair terminals are also commonly encountered in commercial telephone practice and the construction dimensions and arrangement of the distributing terminal are such that any desired number of pairs of terminal posts, within reasonable limits, of course, may be employed. In fact, one of the advantages arising from the method of the present invention is that it greatly facilitates, as compared with methods heretofore employed for installing a distributing terminal, the operation of "changing the count" of a terminal, i. e., removing the face plate from a terminal from which say eleven pairs of service wires have previously been run, and substituting for it another panel having a greater number, say twenty-six pair, and making suitable connections between each of the greater number of terminal posts 17 and the properly electrically associated insulated conductors of which only eleven pairs of conductors were connected with the face plate previously employed.

The panel 13 and the outer ends of its several terminal posts 17 are shielded behind the cover 31 which is hinged at the top as by means of axially aligned pivot pins 32 carried by upstanding legs 33 at the opposite ends of the shell 11. These pivot pins 33 engage ears 34 which extend upwardly from the upper edges of end flanges 36 which extend inwards from the two ends of the cover 31 with the result that the axis of the pivot pins 32 is offset inwardly from the center of gravity of the cover 31 far enough to assure that the cover 31 is retained in its closed position by gravity, thereby establishing sufficiently tight engagement with the forward edges of a boxlike flange 37 which extends forward from the shoulder 16. Hence, the flange 37, the panel 13, and the cover 31, the latter including the end flanges 36 which embrace the outer faces of the vertical or end portions of the flange 37, form a boxlike enclosure within which the outer ends of the terminal posts 17 are adequately protected from the weather even though access thereto is easily achieved simply by raising the cover 31. A plurality of holes 38 extend vertically through the lowest portion of the flange 37 establishing communication between the exterior of the shell and this enclosure within which the outer ends of the terminal posts 17 are situated.

It is through these holes 38 that the service wires 39 or terminal wires may lead in order to connect them to their respectively associated terminal posts 17.

Axially aligned holes 41 (see Figs. 6 and 7) are provided in the two ends of the shell 11 and each is provided with a stuffing box 42 which may be integral with the shell 11, or as illustrated may be threadedly engaged therewith in such a manner as to be rigidly mounted upon the shell and to provide a hermetically tight seal so as to prevent leakage of either gas or liquid where the stuffing boxes 42 make contact with their respective end walls 43 of the shell. Each stuffing box 42 is characterized by a bore 44 of relatively large diameter and a counterbore 46 of slightly greater diameter with a flat annular shoulder 47 separating the bore 44 and counterbore 46. Each stuffing box 42 is also provided with a gland nut 48 threadedly engaged upon its outer end. In some instances, it may be desirable to employ the shell 11 as a junction box interconnecting the several individually electrically insulated conductors 51 of a branch cable 52 (see Figs. 5 and 6) to certain of the individually electrically insulated conductors 53 of the main cable 54, either in addition to its function as a distributing terminal or as a supplementary function thereof in addition to its function of serving as a means for connecting the service wires 39 to certain of the conductors 53 of the main cable 54. Toward this end, the shell 11 is provided with an additional entrance opening 56 in its bottom wall and leading into the interior of the shell behind the panel 13 as clearly shown in Fig. 6. This auxiliary entrance opening 56 is also provided with a stuffing box 57 and gland nut 58 similar in design to those hereinabove described at the ends of the shell.

The means for suspending the shell 11 in operative position preferably comprise hook shaped brackets 61 one of which extends substantially horizontally inwards from the pivot supporting leg 33 at each end at the top of the shell, the parts being so proportioned that the hook portion 62 of each bracket 61 is approximately over the center of gravity of the shell and the weight carried thereby after insulation has been completed. Additionally, an upstanding boss 63 is provided upon the top 64 of the shell midway between its ends, the parts being so proportioned and arranged that a straight line interconnecting the upper extreme of the two hook portions 62 will clear the upper edge 66 of the boss 63 by a distance less than the diameter of the strand 67 upon which the distributing terminal is to be suspended. Moreover, clearance is provided between the ends of the hook shaped brackets and the top 64 of the shell immediately therebelow great enough to permit the cable to be passed therethrough and into the hook portions 62 thereof by moving the cable laterally with respect to the shell, or, more accurately, by moving the shell laterally with respect to the stand 67 so as to engage the hooks 61 upon the strand. In so doing, however, the portion of the strand 67 between the two brackets 61 will have to be deflected upward slightly, as best shown in Fig. 1, in order to permit it to seat upon the upper edge 66 of the boss 63. The advantage of this arrangement lies in the fact that the tension of the strand 61 serves to retain the shell from slipping longitudinally along the strand 67 after it has once been located thereon in desired position and thereby avoids the necessity of providing any clamps or other locking devices for that purpose. As an added measure of security, however, a screw 69 may be provided, threaded downwardly through the inner end of the boss 63 in position for its head to engage the strand 67 and thereby prevent its accidental lateral displacement from the boss 63 (see Fig. 6).

The distributing terminal thus far described constitutes the preferred form of apparatus to be used in performing the method embodying the principles of the present invention. It is to be understood, however, that I do not wish to be limited, in the performance of my improved method, to this specific form of apparatus, as will become apparent as the following description of the method progresses.

The first step in the performance of my improved and simplified method of installing a distributing terminal is illustrated in Fig. 1 and comprises suspending the shell 11 upon the supporting strand 67 in approximately the position, considered longitudinally of the shell, which it is to occupy when installation is completed. Mounting the shell 11 upon the strand 67 is performed as hereinabove described, i. e., engaging the two hook shaped brackets 61 upon the strand 67. If more than one such distributing terminal is to be installed within the length of the run of main cable 54 to be strung, all of such a plurality of distributing terminals should be mounted in this manner upon their respective supporting strands 67 as a step preliminary to stringing the cable 54.

The next successive step in the performance of my method is to run the main cable 54, threading or reeving it through each of the several distributing terminals in the order of their occurrence along the line, according to which cable 54 is being run, with the result that the cable 54 extends through each such distributing terminal in a longitudinal direction, entering the shell 11 of each through the stuffing box 42 at one end thereof and leaving through the other stuffing box thereof, as illustrated in Fig. 2. When so stringing or running the cable 54, however, a loop 101 of slack is left adjacent each of the several distributing terminals through which that run of cable 54 extends.

A predetermined length of cable is then stripped of its sheathing 103, leaving a length 104 thereof wherein the individually electrically insulated conductors 53 thereof are exposed for a distance substantially greater than the length thereof necessary to extend through the shell. In so stripping the sheathing 103 from the cable 54 two new ends 106 and 107 of the sheathing are formed. The gland nut 48 is then unscrewed from the stuffing box 42 on the end of the shell 11 proximal to the loop 101 and it, the gland nut 48, is slid along the cable 54 past the stripped portion 104 thereof and for a sufficient distance beyond the farther new end 107 formed when the said stripping is performed, to accommodate a packing 108. This packing 108 can easily and with relatively little expense be built up by first painting a suitable length of the sheathing 103 with a suitable waterproofing compound, and then by using conventional electrician's rubber tape and friction tape as, for example, by winding one or two layers 109 (see Fig. 8) of ¾" friction tape upon the exterior of the sheathing 103 for a distance of approximately 6". These layers of friction tape are then covered with one or more layers 111 of rubber tape, preferably considerably wider than the friction tape, say in the order of 2" width, until all of the friction tape is covered by the rubber tape which, instead of being built up in cylindrical form wherein the gasket or packing 108 is of the same thickness throughout its entire length, it preferably is so wound as to form a tapered foundation portion 112 of maximum thickness at a point intermediate its ends to minimum thickness at the ends, as best illustrated in Fig. 7. This foundation portion 112 preferably is then provided with a protective covering of friction tape 113. Thereafter a substantially cylindrical portion 114 is built up to a diameter substantially corresponding to the inside diameter of the larger portion 46 of the bore 44 of the associated stuffing box 42, this cylindrical portion 114 preferably being composed mainly of rubber tape but covered with one or more layers of friction tape. Moreover, this cylindrical portion 114 is formed on the foundation portion 112 at the section of greatest diameter thereof, as clearly shown in Fig. 7.

Preferably, a coating of suitable sealing compound is then applied, and a radially split washer 121 is then slipped onto the cable 54 between the shell 11 and the packing 108, this split washer 121 corresponding in outside diameter to the inside diameter of the larger portion 46 of the bore 44 of the associated stuffing box. Another split washer 122 of slightly larger outside diameter is then slipped onto the cable 54 between the packing 108 and the associated gland nut 48 as best shown in Fig. 3.

The next procedural step is to shift the cable 54 and/or the shell 11 so that the newly formed end 106 on the sheathing 103 passes longitudinally through the shell 11 to a point beyond that which it is to occupy upon the completion of the installation, whereupon a similar packing 108 is formed thereon, and similar washers 121, 122 slipped onto the cable; both ends 106 and 107 of the sheathing should then be drawn into their respectively associated stuffing boxes 42 and simultaneously therewith forming a loop 126 of the bared portions 124 of the insulated conductors 53 which hangs out through the open front of the shell 11, as clearly indicated in Fig. 4. In so seating the packings 108 within their respective stuffing boxes, the smaller of the two split washers 121 will be brought into seating relation with the shoulder 47, as illustrated in Fig. 7, and when the associated gland nut 48 is tightened upon its stuffing box 42 the associated cylindrical portion 114 of the packing 108 will be compressed between the two washers 121 and 122, thus effectively providing a liquid- and gas-tight seal between the cable 54 and the shell 11 where the cable passes through the associated end 43 of the shell.

An overall coating of suitable sealing compound may then be applied to the entire exteriorly exposed surface of the stuffing box 42, the gland nut 48, the packing 108, and the immediately adjacent portion of the sheathing 103.

The individual conductors 53 which are to be provided with terminals at a particular distributing terminal are then selected, identification being performed in the manner familiar to those skilled in the art. Each such individual conductor is then bared of its insulation for approximately ½", not at an end of the conductor, but at a bight portion thereof, one of the principal advantages of the present method being that it avoids the necessity of cutting, splicing, or insulating any such splices and also the necessity of forming a difficult, expensive and time-consuming wiped lead sleeve which heretofore has been required to protect such spliced and insulated connections which previous methods of installing terminals have required. According to the present method as hereinabove described, each selected individual conductor 53 is formed into a loop or bight with the ½" bared portion at the end of the bight as indicated at 131 in Fig. 5, which is then attached to the appropriate terminal post 17, being anchored thereto by the associated binding screw 22 and washer 24 in the well known manner. This process is repeated for each of the wires 53 to be provided with terminals at that particular distributing terminal, the wires so selected being arranged in pairs and the wires of each two pair being connected to suitably associated terminal posts 17 so that after installation is complete proper connections of service wires 39 to the outer ends of appropriate terminal posts 17 can readily be effected by wiremen trained in commercial telephone practice.

Unless that particular distributing terminal is to be employed also as a junction box for a branch cable 52, the next procedural step is to bend the loop 126 of wires 53 which have not been connected to terminal posts 17, into a compact loop doubled back upon itself so closely that it can be arranged within the hollow interior of the shell 11. The wires 131 which on the other hand have been connected to individual terminal posts 17 are compacted together as much as their distribution over the back face of the panel 13 readily permits so that the panel 13 can then be placed in position, as indicated in Figures 3 and 6, with all of the wires 53 and 131 enclosed within the shell behind the panel 13, it being understood, of course, that the gasket 15 is interposed between the panel 13 and the shoulder 16 so as to afford a fluid tight seal for the front of the shell 11 when the screws 14 for the panel 13 are tightened.

The installation of the distributing terminal is then completed and all is in readiness for a wireman running an individual service connection from the distributing terminal thus installed to make connections of the appropriate service wires 39 to the outer ends of the appropriate terminal posts 17 in the well known manner.

The distributing terminal of the present invention is equally advantageous for use at the end of a run of cable, rather than in a span thereof as hereinabove described. For such use, the stuffing box 42 at only one end of the shell 11 would have cable extending therethrough, and the stuffing box 42 at the other end would be sealed closed by means of a suitable cap.

In the event that the distributing terminal is also to be employed as a junction box for a branch cable 52, such branch cable is run into the shell 11 through the opening 56 and stuffing box 57 in the bottom wall of the shell 11, it being understood of course that a packing 136 which preferably is similar to the packings 108 previously described is formed on the sheathing of the branch cable 52 adjacent the end of that sheathing and it also being understood that a suitable length 137 of the plurality of individual electrically insulated conductors of the branch cable 52 extend beyond the end of the sheating to permit the required connections to be made to the appropriate wires 53 of the main cable 54. Such connection is made of course with the panel 13 removed so as to give access to both the wires 137 of the branch cable and the wires 53 of the main cable. Such connections may readily be completed, preferably by connecting an end of one of the wires 137 of the branch cable and a bight portion of one of the wires 53 of the main cable to a common terminal post 17 because such method of interconnection avoids the necessity of splicing and insulating each connection. It will be understood of course that splices 138 may be resorted to inside the shell 11 if it is desired to make connections between the wires 137 of the branch cable 52 and the wires 53 of the main cable 54 in such a manner as to prevent giving access, on the outer face of the panel 13, to terminal posts which are electrically connected to the wires 137 of the branch cable 52.

Among the other benefits to be derived from resorting to the method of installing a distributing terminal in accordance with the principles of the present invention is that it avoids the necessity of cutting, splicing and insulating the individual wires of the main cable in order to establish electrical connection thereof to the terminal posts 17 of the panel 13. Consequently, the services of highly skilled cable splicers are not required for such installation and the operation can be carried out rapidly, easily, and with relatively little expense by any ordinary workman skilled in outside telephone work. Moreover, whenever the demands upon the main cable 54 vary to such an extent that a different number of terminal posts 17 would be provided at a certain distributing terminal's location, the panel 13 thereof may be removed and another one substituted therefor having the desired different number of terminal posts 17, again without the necessity of splicing and the consequent insulating and the provision of a wiped lead sleeve to protect such insulated splices. Heretofore, when using the more conventional type of distributing terminal, it has been necessary to remove the terminal box completely, and to substitute one of larger capacity therefor. Not only is the expense of installing the branch wires or "stub," with its accompanying delay and expense of installation avoided, but also the hazard of line trouble developing by breakage or cracking of the lead sheathing and the other disadvantages of such conventional type of distributing terminal installation eliminated by the method of the present invention.

I claim:

1. The method of installing a distributing terminal upon a sheathed, multi-conductor electrical cable, which comprises suspending a terminal shell in approximately the position which it is to occupy when installation is completed, reeving the cable which is to have terminals established therefor through stuffing boxes in opposite walls of said shell, stripping the sheathing from said cable to expose the individually insulated conductors thereof for a distance substantially greater than the length thereof necessary to extend through said shell, locating said shell and said cable with respect to each other so that both of the ends of said sheathing formed by said stripping are outside said shell and said shell is disposed between said ends, forming a packing on said sheathing adjacent each of said ends, forming the portions of said insulated conductors exposed by said stripping into a loop extending through the open front of said shell and drawing said ends of said sheathing into said shell and thereby seating said packings within said stuffing boxes, tightening gland nuts on said stuffing boxes to compress said packings therein, selecting from said looped insulated conductors those certain ones to be provided with terminals, removing the insulation from each of said selected conductors for a length sufficient to be engaged with a terminal post and affixing each to a terminal post individual thereto carried by and extending through a face plate, and seating the sheathed portions of all of said conductors within said shell, and affixing said face plate in closing relation to the opening in the front of said shell.

2. The method of installing a distributing terminal upon a sheathed, multi-conductor electrical cable, which comprises suspending a terminal shell in approximately the position which it is to occupy when installation is completed, reeving the cable which is to have terminals established therefor through stuffing boxes in opposite walls of said shell, stripping the sheathing from said cable to expose the individually insulated conductors thereof for a distance substantially greater than the length thereof necessary to extend through said shell, locating said shell and said cable with respect to each other so that both of the ends of said sheathing formed by said stripping are outside said shell and said shell is disposed between said ends, forming a packing on said sheathing adjacent each of said ends, forming the portions of said insulated conductors exposed by said stripping into a loop extending through the open front of said shell and drawing said ends of said sheathing into said shell and thereby seating said packings within said stuffing boxes, tightening gland nuts on said stuffing boxes to compress said packings therein, selecting from said looped insulated conductors those certain ones to be provided with terminals, removing the insulation from a bight portion of each of said selected conductors for a length sufficient to be engaged with a terminal post and affixing each to a terminal post individual thereto carried by and extending through a face plate whereby all of said selected conductors are electrically connected to their respectively associated terminal posts without severing any of them and without splicing, and seating the sheathed portions of all of said conductors within said shell, and affixing said face plate in closing relation to the opening in the front of said shell.

3. The method of installing a distributing terminal upon a sheathed, multi-conductor electrical cable, which comprises suspending a terminal shell in approximately the position which it is to occupy when installation is completed, reeving the cable which is to have terminals established therefor through stuffing boxes in opposite walls of said shell, stripping the sheathing from said cable to expose the individually insulated conductors thereof for a distance substantially greater than the length thereof necessary to extend through said shell, locating said shell and said cable with respect to each other so that both of the ends of said sheathing formed by said stripping are outside said shell and said shell is disposed between said ends, forming on said sheathing adjacent each of said ends a packing of greater diameter than the smallest portion of the associated stuffing box, forming the portions of said insulated conductors exposed by said stripping into a loop extending through the open front of said shell and drawing said ends of said sheathing into said shell until inward motion of said packings with respect to said shell is arrested by outwardly directed shoulders in said stuffing boxes, tightening gland nuts on said stuffing boxes to compress said packings therein, selecting from said looped insulated conductors those certain ones to be provided with terminals, removing the insulation from each of said selected conductors for a length sufficient to be engaged with a terminal post and affixing each to a terminal post individual thereto carried by and extending through a face plate, and seating the sheathed portions of all of said conductors within said shell, and affixing said face plate in closing relation to the opening in the front of said shell.

4. The method of installing a distributing terminal upon a sheathed, multi-conductor cable, which comprises suspending a terminal shell in approximately the position which it is to occupy when installation is completed, reeving the cable which is to have terminals established therefor through stuffing boxes in opposite walls of said shell, stripping the sheathing from said cable to expose the individually insulated conductors thereof for a distance substantially greater than the length thereof necessary to extend through said shell, locating said shell and said cable with respect to each other so that both of the ends of said sheathing formed by said stripping are outside said shell and said shell is disposed between said ends, forming a packing on said sheathing adjacent each of said ends, placing on said cable between each of said packings and the associated stuffing box a washer of greater diameter than the smallest portion of that stuffing box, forming the portions of said insulated conductors exposed by said stripping into a loop extending through the open front of said shell and drawing said ends of said sheathing into said shell until inward motion of said packings is arrested by outwardly directed shoulders in said stuffing boxes with said washers under compression between their respectively associated shoulders and packings, tightening gland nuts on said stuffing boxes to compress said packings therein, selecting from said looped insulated conductors those certain ones to be provided with terminals, removing the insulation from each of said selected conductors for a length sufficient to be engaged with a terminal post and affixing each to a terminal post individual thereto carried by and extending through a face plate, and seating the sheathed portions of all of said conductors within said shell, and affixing said face plate in closing relation to the opening in the front of said shell.

References Cited in the file of this patent

UNITED STATES PATENTS

| Number | Name | Date |
|---|---|---|
| 2,318,755 | Channell | May 11, 1943 |
| 2,434,102 | Channell | Jan. 6, 1948 |
| 2,496,949 | Malhiot | Feb. 7, 1950 |
| 2,507,780 | Gilbert | May 16, 1950 |
| 2,536,778 | Steinmayer | Jan. 2, 1951 |